United States Patent [19]

Lanfranco

[11] Patent Number: 5,062,200
[45] Date of Patent: Nov. 5, 1991

[54] DEVICE FOR THE ASSEMBLY OF SMALL ELECTRICAL MACHINES

[75] Inventor: Antonello Lanfranco, Turin, Italy

[73] Assignee: Aspera S.r.l., Turin, Italy

[21] Appl. No.: 617,753

[22] Filed: Nov. 26, 1990

Related U.S. Application Data

[62] Division of Ser. No. 411,533, filed as PCT/EP88/00165 Apr. 3, 1988, published as WO88/07781 Oct. 10, 1988, Pat. No. 5,010,638.

[30] Foreign Application Priority Data

Apr. 1, 1987 [IT] Italy ............................. 67257 A/87

[51] Int. Cl.$^5$ ............................................. H02K 15/14
[52] U.S. Cl. ................................... 29/732; 29/281.1; 29/596
[58] Field of Search ............... 29/732, 736, 596, 598, 29/281.1; 310/42

[56] References Cited

U.S. PATENT DOCUMENTS 3,490,143 1/1970 Hull ........................................ 29/596
3,864,822 2/1975 Eash et al. ......................... 29/732 X Primary Examiner—Carl E. Hall
Attorney, Agent, or Firm—Sughrue, Mion, Zinn, Macpeak & Seas

[57] ABSTRACT

A device for assembling a stator formed by a stack of core laminations and windings on to a respective head support includes thrust members for clamping the stack between the thrust members and coplanar surfaces on the support. A centering device is provided which can be interposed between a shaft mounted in the support and the stack. The stack is traversed by a plurality of peripheral bolts situated in correspondence with the coplanar surfaces and are perpendicular to the coplanar surfaces and which are screwed into the support. The thrust members clamp the stack to the support with clamping forces at least substantially equal to the tightening forces to be applied by the bolts on the stack.

8 Claims, 4 Drawing Sheets

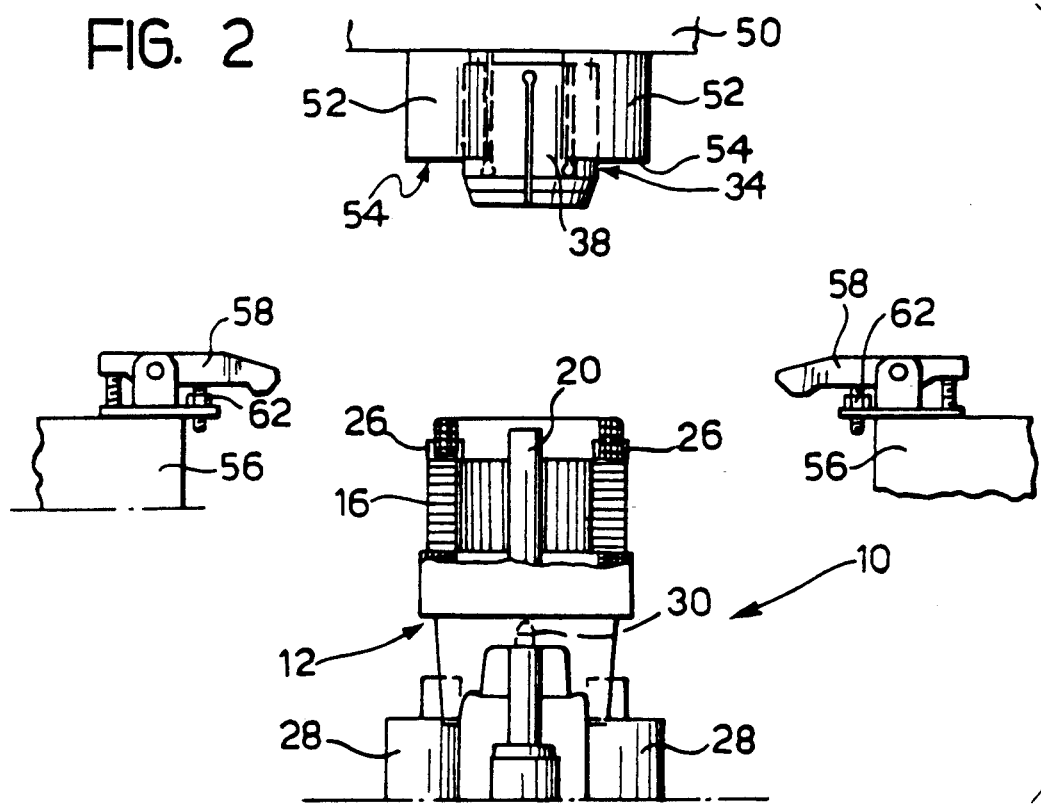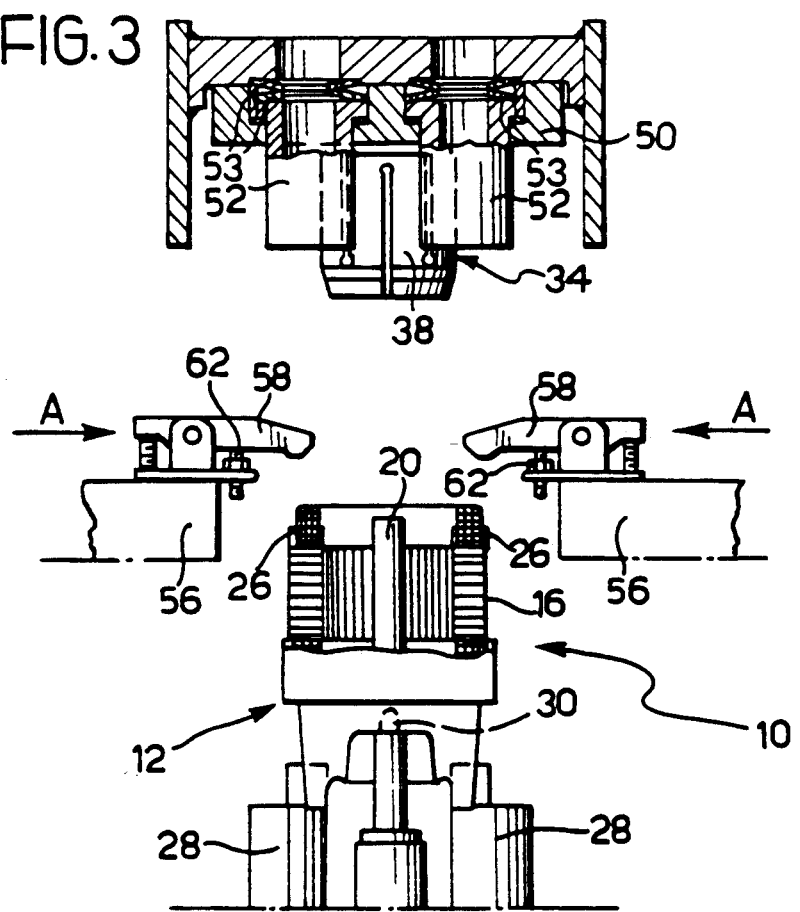

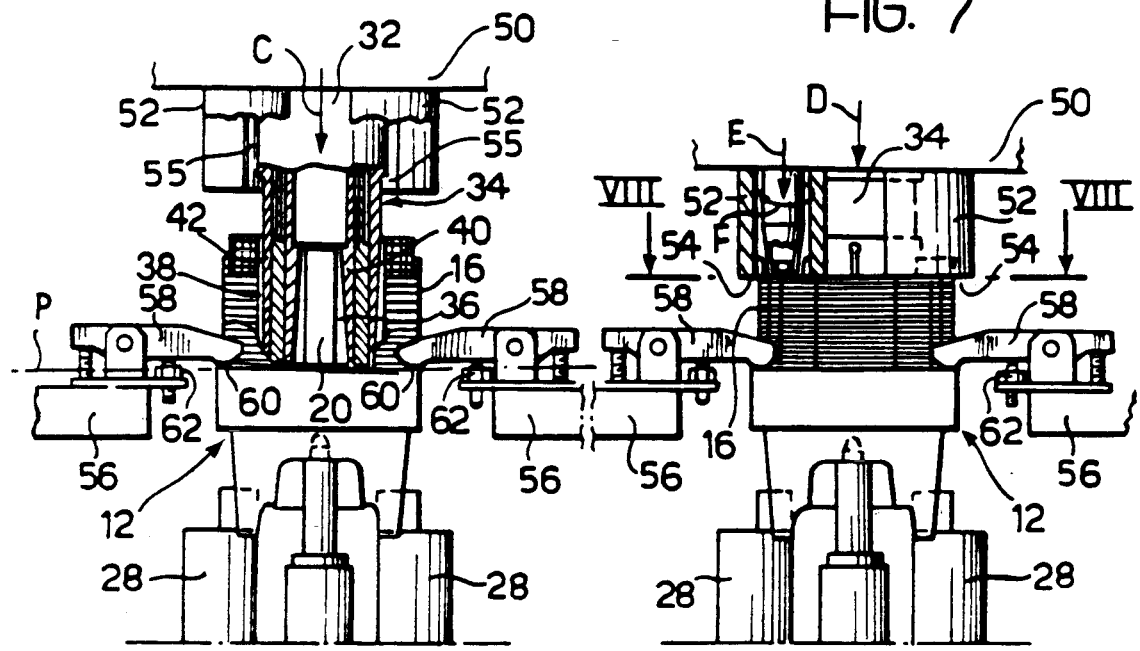
FIG. 6
FIG. 7
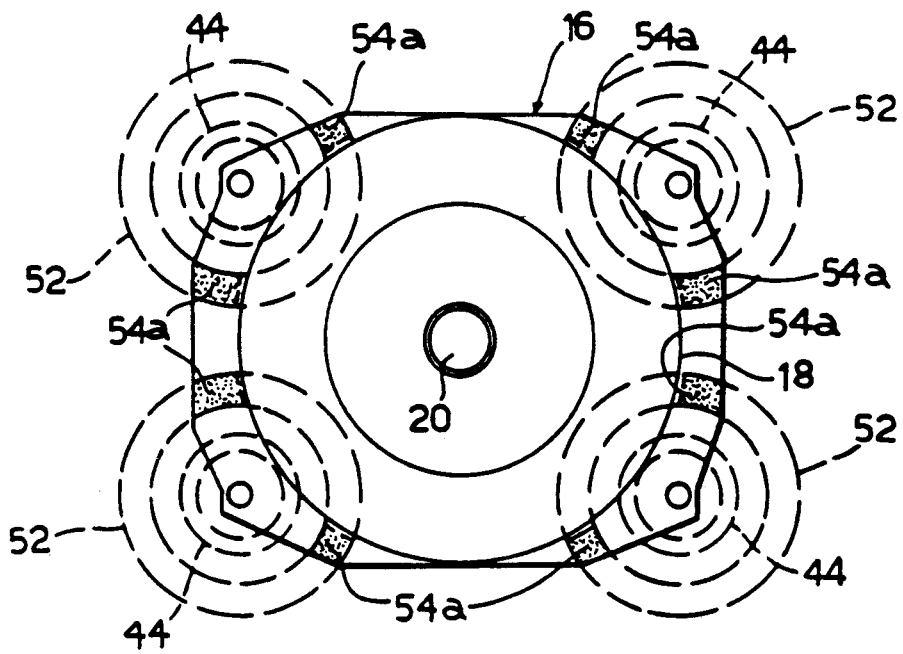
FIG. 8

DEVICE FOR THE ASSEMBLY OF SMALL ELECTRICAL MACHINES

This application is a divisional application of U.S. Ser. No. 411,533, filed as PCT EP88/00165 Apr. 3, 1988, published as WO88/07781 Oct. 10, 1988, now U.S. Pat. No. 5,010,638.

The present invention relates to the manufacture of rotary electrical machines and has been developed for the manufacture of hermetic motor-compressor units for refrigerant fluids.

It relates, in the first place, to a method for assembling a stator, formed by a stack of core laminations amd windings therefor on a respective head support of a small rotary electrical machine in a position concentric with a rotary shaft mounted in the support. The periphery of one end face of the stack of laminations rests on on peripheral coplanar surfaces of the support which define a reference plane. A centering device is interposed between the shaft and the stack and the stack and support are held together by means of peripheral bolts inserted in regions corresponding to the coplanar syrfaces of the support, perpendicular to the surfaces, and are screwed into the support.

A method of this type is known from the document IT-A-996,643. In this document, a centering device is described, inter alia, which includes two concentric, "tulip"-type collets, of which the inner one is designed to contract around the shaft and the outer one is designed to expand against the surface of the bore in the stack of laminations.

This collet ensures very accurate centering of all the laminations in the stack relative to the shaft before the stack is clamped by means of the bolts. When the bolts are tightened, however, the clamping torque is transmitted, by friction, from the heads of the bolts to the immediately-adjacent lamination, causing the first lamination to be forced radially against the outer collet; this force is transmitted by friction to successive laminations so that the laminations are forced along a generatrix against the outer collet and, when this is released, the accuracy of centering obtained thereby is cancelled out. This inaccuracy means, on the one hand, that larger air gaps have to be provided in the design stage and this reduces the efficiency of the electrical machine. What is worse in the case of a non-synchronous motor, is that the mutual displacement of the laminations caused by tightening of the bolts causes irregularities in the air gaps resulting in the motor being unable to reach its starting torque under load. This problem is particularly serious in the case of small hermetic motor compressors for refrigerators, particularly considering the fact that testing of the motor is carried out only on the finished compressor, that is when the compressor motor is enclosed in its hermetic casing. In this case, rejection of the compressor due to defects in its motor involves a cost corresponding to that of the finished product.

Currently, in order to avoid displacement of the laminations during tightening of the bolts, in small electric motors, before the construction of the windings, the stator stack is impregnated with a thermosetting resin whose hardening results in a monolithic stack in which the laminations can no longer be displaced by the tightening torque. Methods of this type are known inter alia, from the documents U.S. Pat. No. 3,356,360 and U.S. Pat. No. 3,573,129.

Impregnation is a fairly expensive operation both in capital expenditure and in time: from the latter point of view, it constitutes a lengthy additional step in the manufacture of an electrical machine.

According to another method, known from the document FP-A-1,452,093, a stator stack of laminations is fitted around an expandable collet of the "tulip"-type. After the collet has been expanded in the bore of the stack, the latter is submitted to axial compression. While the stack is compressed the laminations are welded together on the periphery of the stack to obtain a monolithic stack.

The document FR-A-2,093,227 discloses a method similar to that of FR-A-1,452,093. According to FR-A-2,093,227 use is made of a non-expandable mandrel and the laminations of the stack under axial compression, with the mandrel fitted in the bore of the stack, are welded along welding lines adjacent to the bolt holes.

The methods according to FR-A-1,452,093 and FR-A-2,093,227 have the drawback of requiring welding operations which constitute a lengthy additional step in the manufacture of an electrical machine.

The main object of the present invention is to provide a method which enables a small electrical machine to be produced with a very small, regular air gap between the stator and the rotor without the need to impregnate or weld the core stack.

According to the present invention, this object is achieved by means of a method wherein before tightening the bolts, the stack is clamped between the coplanar surfaces on one side and thrust members on the other side, said thrust members being applied to the other end face of the stack in regions also corresponding with the regions of insertion of the bolts, with clamping forces normal to the reference plane and at least substantially equal to those predetermined for the tightening of the bolts. The bolts are then tightened with the predetermined tightening force and the clamping force applied by the force members is then released.

Thanks to this solution the following takes place:

before tightening of the bolts, the stack, which has already been centered around the shaft with the maximum possible precision by a centering device such as the double collet of the document IT-A-996,643, is put into substantially the same final condition of compression as that in which the bolts will hold the stack after they have been tightened;

since the bolts are tightened on to the compressed stack, the mutual friction between laminations, due to compression by the thrust members, prevents them from sliding relative to each other.

From the documents U.S. Pat. No. 3,356,360 and U.S. Pat. No. 3,573,129, compression of an unwound stack, by means of a tool, with a view to impregnating it with a thermosetting resin is known but this is to achieve a different object from that of the present invention. Indeed, according to these documents, the object of the precompression is to reduce the quantity of resin necessary to impregnate the pack. After hardening of the resin, the precompression caused by the tool is released. In other words, this precompression is not used to put the stack of an already-wound stator into the condition in which it will be after tightening of the bolts.

The document U.S. Pat. No. 4,290,291 discloses an apparatus in which a stack of laminations of an already-wound stator is submitted to axial compressive forces between pads that simulate mounting pads in a compressor. The compressive forces simulate and closely approximate the compressive forces that ultimately will be applied to the bolt hole regions under the heads of mounting bolts in a compressor. Various eccentricities and dimensional variations between the bore and bolt holes are transferred to the bore. While the stack is held with the preselected compressive force, the bore is shaped with a roller burnisher so that it will be concentric relative to the bolt holes.

This method does not solve the problem of the invention. After the burnishing step, which represents an additional cost, the compressive forces are released and the stator is no longer in the condition in which it will be after tightening of the bolts. Thus, also in this case the tightening of the bolts gives rise to the same drawbacks mentioned in connection with the prior art of IT-A-996,643, that is the loss of accurate centering obtained by the burnishing.

The invention also relates to a device for carrying out the method and to a small electrical machine and a unit including such a machine, produced by the method.

By the term unit is meant particularly, but not exclusively, a motor-compressor for refrigerant fluids in which the support for the stator is constituted by the body or crankcase of the refrigerant-fluid compressor.

The invention will be understood more clearly from a reading of the detailed description which follows, with reference to the attached drawings which show, by way of non-limiting example, the device and the method according to the invention in their application to the assembly of a motor-compressor unit for refrigerant fluids.

In the drawings:

FIG. 2 is a partially-sectioned elevational view showing diagrammatically the motor-compressor unit and the parts of the device in the same positions as in FIG. 1.

FIG. 3 is a view similar to that of FIG. 2 showing the motor-compressor unit and the parts of the device in a position corresponding to a preparatory step of the method.

Figure 5:
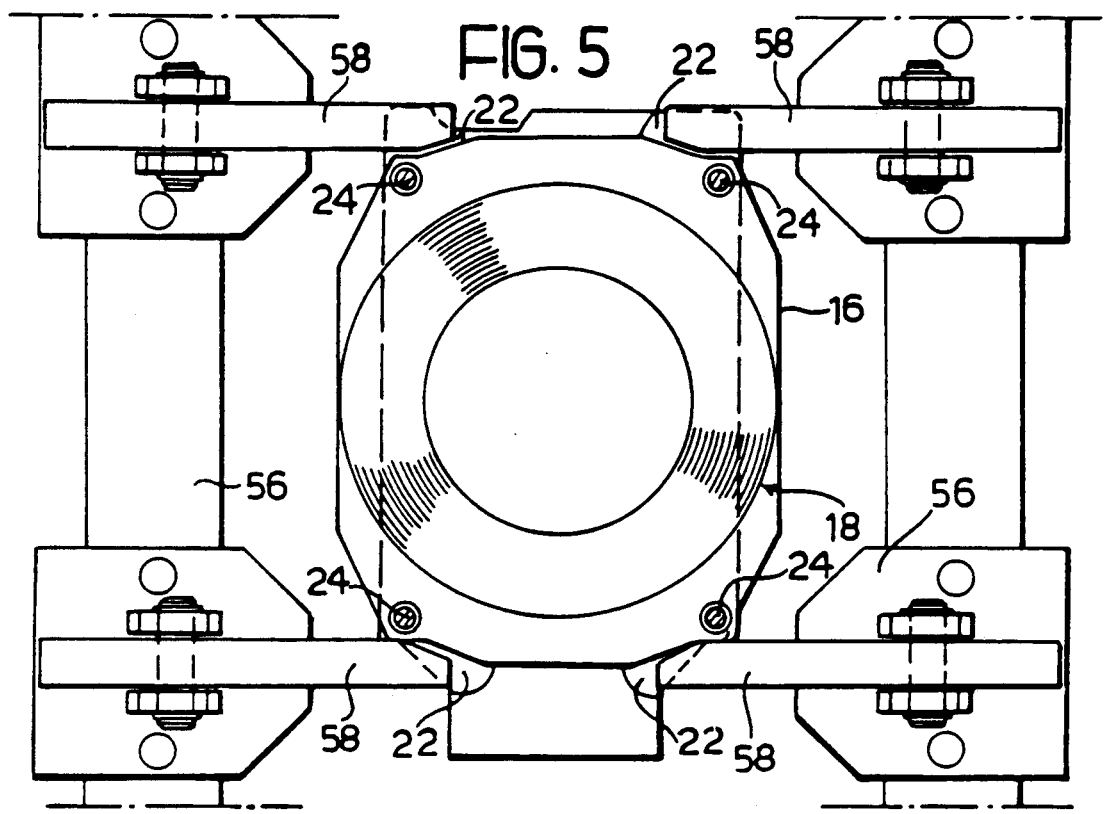
Figure 4:
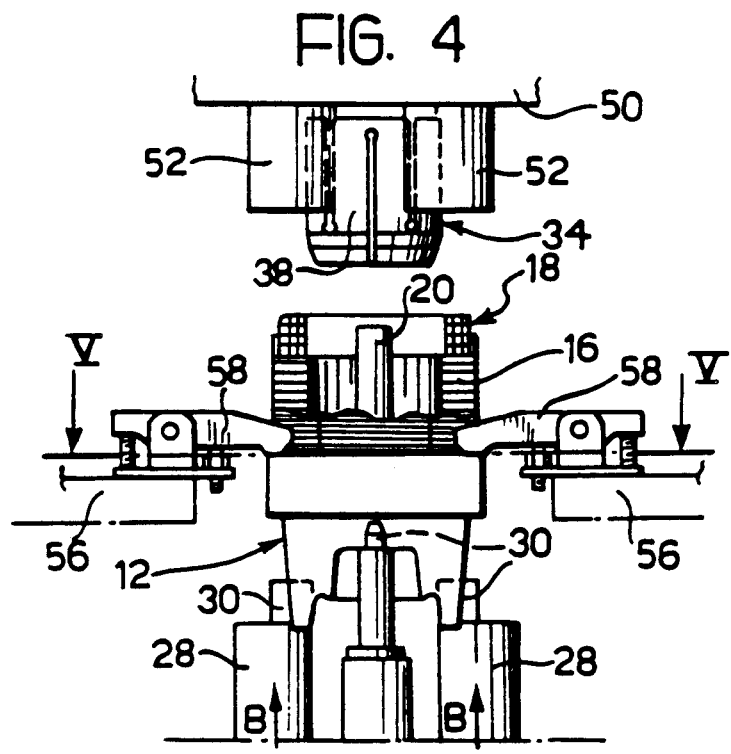
FIG. 4 is a view similar to that of FIGS. 2 and 3 showing the motor-compressor unit and the parts of the device in a first step of the method.

FIG. 5 is a plan view seen as indicated by the arrow V of FIG. 4 showing the motor-compressor unit and certain parts of the device in the same conditions as in FIG. 4, on an enlarged scale, FIGS. 6 and 7 are elevational views similar to the above which show the motor-compressor unit and the parts of the device in two subsequent steps of the method, and FIG. 8 is a section taken in the plane indicated by the line VIII—VIII of FIG. 7 on an enlarged scale, showing the unit and parts of the device in the same conditions as in FIG. 7.

Figure 1:
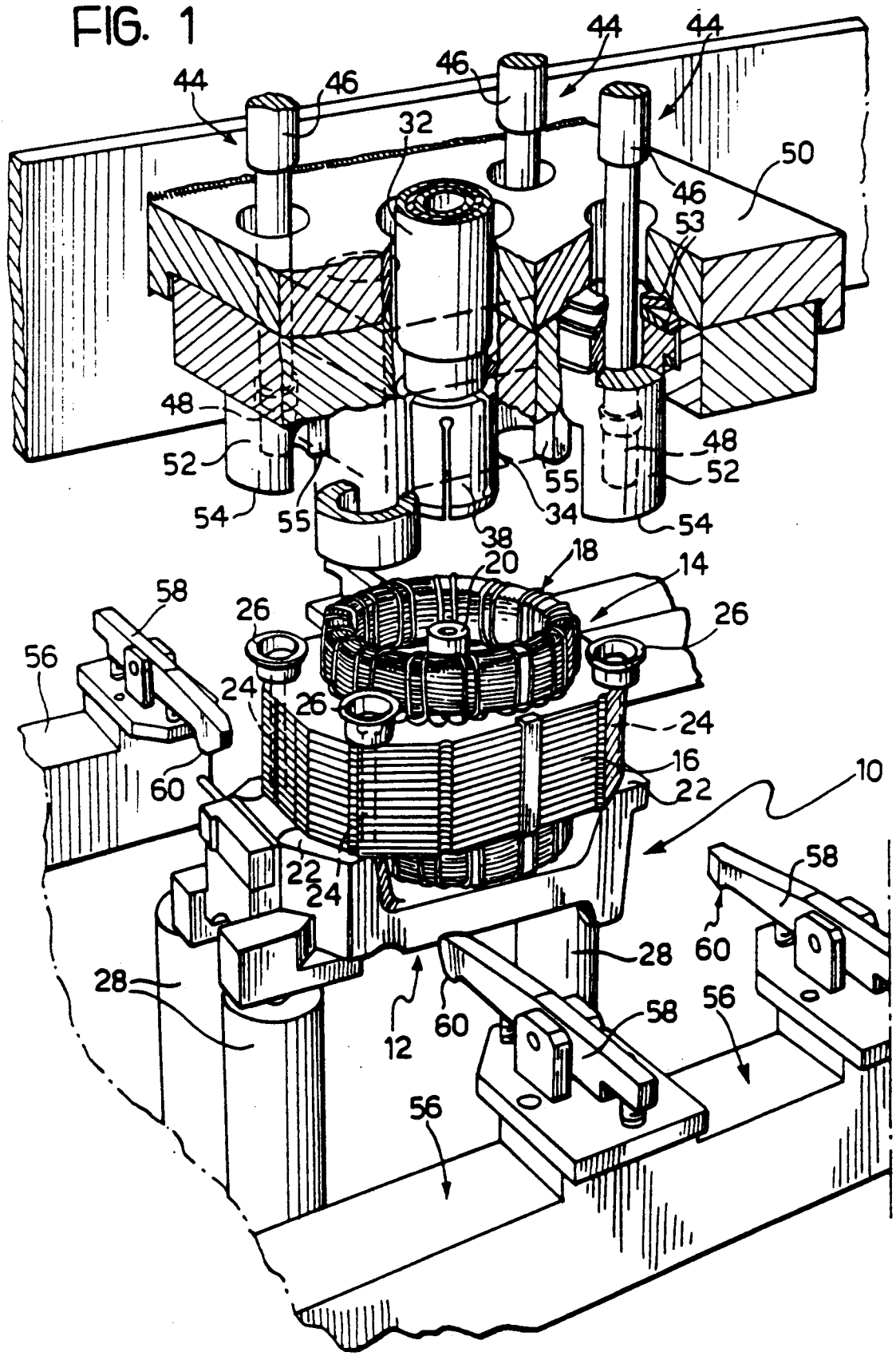
FIG. 1 is a perspective view of a motor-compressor unit arranged for the stator stack of its electric motor to be centered and clamped in a device according to the invention, in which the principal parts of the device designed to cooperate with the unit to carry out the method according to the invention are also shown in the positions in which they are situated before the method is carried out.

Particular reference will be made to FIG. 1 to describe the motor-compressor unit, generally indicated 10, which is submitted to the method according to the invention and the principal members of the device for carrying out the method. The various parts of the unit and of the device also appear in the other drawings which may be referred to, and in which they are indicated by the same reference numerals.

The motor-compressor unit 10 includes a body or crankcase 12 consisting of an iron or light alloy casting. The body 12 acts as a head support for the stator, generally indicated 14, of an electric motor. The stator 14 comprises a stack of core laminations 16 with its windings 18.

The body 12 also supports a rotary shaft 20 which constitutes both the shaft of the electric motor and the crankshaft of the compressor, of which the casing 12 also forms a part.

One end face of the stack 16 rests on ground, coplanar peripheral surfaces 22 of the body 12. These surfaces 22, for the reason which will be explained below, project relative to the periphery of the stack 16.

Bolts 24 extend through the stack 16 in correspondence with the coplanar surfaces 22. The axes of the bolts 24 are normal to the plane defined by the surfaces 22.

The bolts 24 are screwed into corresponding threaded holes in the body 12. Their function is to clamp the laminations of the stack 16 together and to fix the stack 16 firmly to the body 12. A further function of the bolts 24 is to fix respective annular caps 26 to the stack. The stacks 26 are designed to receive helical springs for suspension of the unit 10 (upside-down relative to the position shown in FIG. 1) in the hermetic casing of a compressor.

The main components of the device according to the invention will now be described in its use with a motor-compressor unit such as that indicated 10.

The device includes a lower assembly consisting essentially of means for supporting the body 12 in the arrangement illustrated in FIGS. 1 to 4,6 and 7, in which the coplanar surfaces 22 are substantially horizontal and facing upwards. In the embodiment shown, the support means comprise three columns 28 which are movable vertically upwards and downwards, as will be better explained below. At its upper end, each column 28 carries a respective shaped support 30 on which the body 12 rests.

At the lower end of each column 28 there is a respective thrust member (not shown) for driving the vertical upward and downward movement of the respective column and for exerting an upward reaction force on the body 12 through the respective column 28 and its support 30. More will be said about this force below. For now, it will suffice to say that the thrust members are independent of each other both with regard to their travel in operation and to the generation of the force exerted.

The thrust members preferably consist of linear fluid actuators, but wedges movable transversely to the direction of movement of the columns 28 and their supports 30 could be used instead.

The device according to the invention also includes an upper assembly the principal parts of which will now be described.

The upper assembly comprises a central column 32, movable vertically upwards and downwards, which supports beneath it a double collet 34 of the "tulip"-type, described and shown in detail in the document IT-A-996,643 to which the reader is referred.

Some details of the double collet 34 are shown in FIG. 6 to which reference will be made briefly.

The double collet comprises an inner collet 36 and an outer collet 38. The inner collet 36 is radially contractible and arranged to grip and center the shaft 20. The outer collet 38, on the other hand, is radially expansible and designed to engage the surface of the bore in the stack 16 and to center the stack relative to the shaft 20. Contraction of the inner collet 36 is caused by means of a conical bush 40 and expansion of the outer collet 38 is caused by means of a conical bush 42.

The two bushes 40 and 42 are carried by the lower ends of respective tubular, concentric shafts which are slidable within the column 32 and are driven by respective linear fluid actuators, not shown. Another actuator, not shown, causes the column 43 and the double collet 34 to descend and rise.

The upper assembly also includes pneumatic screwdrivers 44 for screwing the respective bolts 24. Each screwdriver essentially comprises a rotary shaft 46, movable vertically along its axis and carrying a screwing head or socket wrench 48 at its lower end. The upper ends of the shafts 44 are associated with respective pneumatic motors or the like. The screwing heads 48 are arranged to engage the hexagonal heads of the bolts 24 within the caps 26.

The upper assembly also includes a pressure plate 50 which is movable vertically upwards and downwards independently of the shafts 46 and has holes for the passage of these shafts. Sleeve-shaped thrust members 53 are associated with the plate 50. The sleeves 52 are slidable in the plate 50 in the direction of its movement and react against the plate itself, with the interposition of disc compression springs 53, preferably of the Bauer type.

The sleeves 52 have respective lower radial faces 54 which, as will be better explained below, are arranged to engage the upper lamination of the stack 16 in the region immediately surrounding the caps 26. In the embodiment shown, the sleeves have a lateral rotch 55 so as not to interfere with the head of the winding 18 during the compression of the stack 16 which will be described below.

A fluid actuator is associated with the pressure plate 50 and is arranged to cause both vertical travel of the sleeves 52, independently of the travel of the screwdrivers 44, and to exert a clamping force, of which more will be said below, on the stack 16 by means of the springs 53 and the radial faces 54 of the sleeves 52.

The device according to the invention also includes a pair of opposite lateral slides 56 which are movable horizontally towards the unit 10 carried by the support means 28, and in the opposite direction. Each of the slides 56 carries a pair of fingers 58 in the form of rockers, each arranged to pivot slightly in a vertical plane. Each finger 58 has a downwardly-facing shoulder surface 60 against which one of the coplanar surfaces 22 of the body 12 is intended to abut for the purpose which will be explained below. For now, it will suffice to say that each finger 58 can pivot between a rest position, in which it is slightly lowered as in FIGS. 2 and 3, and a slightly raised position, as in FIGS. 4,6 and 7. This raised position is determined by adjustment screws 62 in such a way that the shoulder surfaces 58 define a reference plane P which is strictly perpendicular to the vertical axes of the components of the upper unit of the device and, in particular, to the vertical axes of the sleeves 52.

Reference will now be made to FIG. 2 and to subsequent Figures to describe the operation of the device and the method carried out thereby.

The device preferably consists of a work station incorporated in a assembly line in which units such as 10 are transported in a direction normal to the plane of the drawing of FIG. 2.

When a unit 10 arrives at the station, it is placed, in a manner not shown, on the supports which, together with their columns 28, are in a lowered position.

In this preliminary step of FIG. 2, the whole of the upper assembly is raised and the slides 56 are moved apart and away from the unit 10.

It should be mentioned that, in the unit 10 which arrives at the station, the bolts 24 are screwed into the body 12 but not tightened so that the laminations of the stack 16 are loose.

In a subsequent step of the method, the slides 56 are moved closer together, in the direction of the arrows A of FIG. 3, so that the shoulder surfaces 50 of the fingers 58 overlap the coplanar surfaces 22 of the frame 12.

In a further subsequent step illustrated in FIG. 4, the three columns 28 are moved upwardly in the direction of the arrow B until the coplanar surfaces 22 abut the shoulder surfaces 60. In this way, the fingers 58 effect their small angular upward movement until the point at which the shoulder surfaces 60, and hence the coplanar surfaces, are brought with maximum precision into the plane P which, from this point onwards, constitutes a reference plane for the whole of the rest of the operation.

The situation of FIG. 4 is clarified by the plan view of FIG. 5.

In the next step of the method illustrated in FIG. 6, the whole of the double collet 34 is moved downwardly in the direction of the arrow C until it is interposed between the shaft 29 and the surface of the bore in stack 16. The inner collet 36 is next contracted around the shaft 20 and then the outer collet 38 is expanded against the inner edges of the laminations which define the surface of the bore in the stack 16. In this operation, all the laminations of the stack 16 are centered as exactly as possible about the shaft 20 by virtue of the fact that the laminations, being loose, can slide on each other.

In the next step, illustrated in FIG. 7, the pressure plate 50 is moved downwardly in the direction of the arrow D until the radial faces 54 of the sleeves 52 abut the upper lamination of the stack 16 around the caps 26.

The faces 54, because of the actuator associates with the pressure plate 50, exert a clamping force normal to the reference plane P between these surfaces and the coplanar surfaces 22 of the body 12. This clamping force is equal to or at least substantially equal to that predetermined for subsequent tightening of the bolts 24. By virtue of the springs 53, both the travel in operation and the clamping force exerted by each sleeve 52 are independent of those of the other sleeves 52.

The reaction force exerted by the thrust members associated with the lower columns 28 is such as to ensure that the coplanar surfaces 22 remain firmly applied against the shoulder faces 60 of the fingers 58, that is that they remain in the reference plane P.

The plan view of FIG. 8 shows, inter alia, circular sector-shaped dotted areas 54a where the radial faces 54 exert pressure on the upper lamination of the stack 16. As will be seen, there are two areas 54a in the neighbourhood of each bolt 24, located substantially symmetrically about the axis of the bolt 24 so that the resultant of the forces exerted thereby is substantially on the axis of the bolt itself.

Whilst the stack 16 is clamped by the thrust members constituted by the sleeves 52, the screwdrivers 44 are lowered (arrow E) and their screwing heads 48 engage the heads of the bolts 24.

Finally, the shafts 46 of the screwdrivers 44 are rotated (arrow F), fully tightening the bolts 12 with a torque such as to exert the predetermined clamping force on the pack by means of the bolts themselves.

The method of assembling the stator 14 on its end support constituted by the body 12 of the compressor is thus completed and the various components of the device are returned to the positions of FIG. 2. The bolted unit 10 is then moved away on the conveyor line and sent on to a station for fitting the rotor into the stator cavity.

I claim:

1. A device for assembling a stator comprised of a stack of core laminations (16) and stator windings (18), on to a respective head support (12) of a small rotary electrical machine, in a position concentric with a rotary shaft (20) mounted in the support (12), wherein the periphery of one end face of the stack (16) rests on the peripheral coplanar surfaces (22) of the support (12) which define a reference plane (P), and the stack (16) is traversed by peripheral bolts (24) situated in correspondence with the coplanar surfaces (22), perpendicular to these surfaces and which are screwed into the support, the device including means for supporting the support, a centering device (34) which can be interposed between the shaft (20) and the stack (16) and means (44) for tightening the bolts, characterised in that the device also includes thrust members (52) for clamping the stack (16) between the thrust members and the coplanar surfaces (22), before the bolts (24) are tightened and while the centering device (4) keeps the stack centered relative to the shaft (20), with clamping forces normal to the reference plane (P) and at least substantially equal to those predetermined tightening forces to be applied by the bolts on the stack.

2. A device according to claim 1, characterised in that it also includes coplanar shoulder surfaces (60) against which regions of the coplanar surfaces (22) projecting relative to the periphery of the stack (16) can be applied before the stack is clamped by the thrust members (52), and the support means (30) for the support (12) are movable towards the shoulder surfaces (60) to apply the projecting regions of the coplanar surfaces (20) against the shoulder surfaces (60) with irreversible forces reacting in the direction opposite to the force which will be exerted by the thrust members (52), and in that the thrust members (52) are arranged so as to exert forces on the stack (16) normal to a plane defined by the shoulder surfaces (60).

3. A device according to claim 2, characterised in that the shoulder surfaces (60) are each formed by a respective pivoting finger (58) with which is associated a respective adjustable stop (62) for defining a stop position for the pivoting fingers (58) in which the shoulder surfaces (60) engaged by the respective projecting regions of the coplanar surfaces (22) are situated in the reference plane (P).

4. A device according to claim 2, characterised in that the support means consist of several supports (30) movable independently of each other, each of which is associated with a respective thrust member arranged to generate a reaction force independent of that of the other thrust members.

5. A device according to claim 4, characterised in that the thrust members are linear fluid actuators.

6. A device according to claim 4, characterised in that the thrust members consist of wedges movable transversely to the direction of movement of the supports (30) and cooperating with the supports to cause the movement of the latter and generate their reaction forces.

7. A device according to claim 1, characterised in that the means for tightening the bolts are constituted by screwdrivers (44) which comprise an axially movable rotary shaft (46) with a terminal screwing head (48), in that the thrust members consist of sleeves (52) each of which surrounds a screwing head (48), has a flat radial end face (54) for engagement with the stack (16) in the neighbourhood of the axis of a respective bolt (24), and is carried slidably along the axis of the respective screwdriver (44) by the pressure plate (50) and reacts against this plate (50) with the interposition of a compression spring (53), and in that the pressure plate (50) is movable along the shafts (46) of the screwdrivers (44) and independently of these and is associated with a fluid actuator for moving the pressure plate (50) and its sleeves (52) towards the stack (16) and for exerting the clamping force by means of the radial faces (54) of the sleeves (52) through the compression springs (53).

8. A device according to claim 7, characterised in that each radial face (54) is such as to engage the stack (16) in two areas (54a) which are substantially symmetrical about the axis of the respective bolt (24).

* * * * *

UNITED STATES PATENT AND TRADEMARK OFFICE
CERTIFICATE OF CORRECTION

PATENT NO. : 5,062,200
DATED : November 5, 1991
INVENTOR(S) : Antonello Lanfranco It is certified that error appears in the above-indentified patent and that said Letters Patent is hereby corrected as shown below:

On the title page, Item [62], line 2, change "Apr. 3, 1988" to --March 4, 1988 --.

Signed and Sealed this

Twenty-fourth Day of August, 1993

Attest:

BRUCE LEHMAN

*Attesting Officer*  *Commissioner of Patents and Trademarks*